(12) United States Patent  (10) Patent No.: US 9,112,557 B2
Liu et al.  (45) Date of Patent:  Aug. 18, 2015

(54) WIRELESS COMMUNICATION DEVICE

(71) Applicant: Huawei Device Co., Ltd., Shenzhen, P.R. (CN)

(72) Inventors: Qing Liu, Shenzhen (CN); Huiliang Xu, Shenzhen (CN); Yao Lan, Shenzhen (CN); Shuhui Sun, Shenzhen (CN); Dongxing Tu, Shenzhen (CN); Dingjie Wang, Shenzhen (CN); Peihua Shuai, Shenzhen (CN); Ping Lei, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/659,608

(22) Filed: Oct. 24, 2012

(65) Prior Publication Data

US 2013/0050049 A1   Feb. 28, 2013

Related U.S. Application Data

(63) Continuation of application No. PCT/CN2011/075172, filed on Jun. 2, 2011.

(30) Foreign Application Priority Data

Jun. 21, 2010  (CN) .......................... 2010 1 0208039

(51) Int. Cl.
*H01Q 1/50*  (2006.01)
*H04B 1/04*  (2006.01)
(Continued)

(52) U.S. Cl.
CPC ............. *H04B 1/0458* (2013.01); *H01Q 1/245* (2013.01); *H04B 1/3838* (2013.01)

(58) Field of Classification Search
CPC ....................................................... H01Q 1/52
USPC ......................................................... 343/860
See application file for complete search history.

(56) References Cited

U.S. PATENT DOCUMENTS

2004/0204027 A1  10/2004  Park et al.
2005/0030233 A1*  2/2005  Kim et al. ..................... 343/702
(Continued)

FOREIGN PATENT DOCUMENTS

CN   201064050 Y   5/2008
CN   101562460 A   10/2009
(Continued)

OTHER PUBLICATIONS

Partial Translation of First Chinese Office Action dated Jun. 12, 2012 in connection with Chinese Patent Application No. 201010208039.4, 14 pages.
(Continued)

*Primary Examiner* — Graham Smith

(57) ABSTRACT

The present invention provides a wireless communication device. The wireless communication device includes a mainboard and a connecting member, in which the mainboard includes a mainboard body and a mainboard end part which is connected to the connecting member; the side of the mainboard body away from the mainboard end part is connected to an antenna; and a matching network is arranged between the mainboard body and the mainboard end part and configured to control the distribution of the surface current induced by the antenna on the mainboard. By arranging the matching network between the mainboard body and the mainboard end part of the wireless communication device and changing, through the matching network, the distribution of the surface current induced by the antenna, the embodiments of the present invention may simultaneously guarantee the SAR performance and the wireless performance of a wireless communication terminal and improve the user experience.

20 Claims, 2 Drawing Sheets

(51) Int. Cl.
*H01Q 1/24* (2006.01)
*H04B 1/3827* (2015.01)

(56) References Cited

U.S. PATENT DOCUMENTS

| | | |
|---|---|---|
| 2010/0142597 A1 | 6/2010 | Zhang et al. |
| 2010/0283691 A1* | 11/2010 | Su et al. ........................ 343/702 |
| 2012/0003944 A1 | 1/2012 | Bai |
| 2012/0176750 A1 | 7/2012 | Xie et al. |

FOREIGN PATENT DOCUMENTS

| | | |
|---|---|---|
| CN | 101674674 A | 3/2010 |
| CN | 101702461 A | 5/2010 |
| CN | 101867385 A | 10/2010 |
| EP | 1 206 000 A2 | 5/2002 |

OTHER PUBLICATIONS

International Search Report dated Aug. 25, 2011 in connection with International Patent Application No. PCT/CN2011/075172.
Partial Translation of Office Action dated Mar. 4, 2013 in connection with Chinese Patent Application No. 201010208039.4.
Written Opinion of the International Searching Authority dated Aug. 25, 2011 in connection with International Patent Application No. PCT/CN2011/075172.
Supplementary European Search Report dated May 27, 2013 in connection with European Patent Application No. EP 11 79 7574.

* cited by examiner

WIRELESS COMMUNICATION DEVICE

CROSS-REFERENCE TO RELATED APPLICATIONS

This application is continuation of International application No. PCT/CN2011/075172, filed on Jun. 2, 2011, which claims priority to Chinese Patent Application No. 201010208039.4, filed with the Chinese Patent Office on Jun. 21, 2010, both of which are incorporated herein by references in their entireties.

TECHNICAL FIELD

The present invention relates to the field of communications technologies, and in particular, to a wireless communication device.

BACKGROUND

The applications of various wireless communication device products become more and more popular with the development of the communication technologies; users are increasingly concerned with effects of electromagnetic radiation induced by the wireless communication devices on human health while enjoying the conveniences brought about by the wireless communication devices. Specific absorption rate (Specific Absorption Rate, hereinafter referred to as SAR), as an indicator of measuring the intensity of the electromagnetic radiation when a wireless communication device is close to the body, becomes the content labeled in the product packaging or product specification by the manufacturers of mobile user terminals in many countries and regions. At present, the problem of excessive SAR value has become the major problem in the industry. Furthermore, the wireless performance is one of the important indicators of measuring the quality of wireless communication devices, and therefore, guaranteeing the wireless performance of wireless communication terminals while improving its SAR performance has become a big challenge of the study at the present stage.

A double grounding structure is arranged in a wireless communication device with a rotatable universal serial bus (Universal Serial Bus, hereinafter referred to as USB) connector in the prior art; a first grounding path is formed of a USE connector, a flexible printed circuit board (Flexible Printed Circuit Board, hereinafter referred to as FPC) and a printed circuit board (Printed Circuit Board, hereinafter referred to as PCB) mainboard; and a second grounding path is formed of the USE connector, a metal elastic pin, a metal rotating shaft and the PCB mainboard. The grounding performance of the PCB mainboard is enhanced through the two grounding paths, and therefore improving the low-frequency wireless performance of the wireless communication terminal.

However, the wireless communication device in the prior art cannot simultaneously guarantee the SAR performance and the wireless performance.

SUMMARY

Embodiments of the present invention provide a wireless communication device, which simultaneously guarantees the SAR performance and the wireless performance of a wireless communication terminal and improves the user experience.

The embodiments of the present invention provide a wireless communication device, which includes a mainboard and a connecting member. The mainboard includes a mainboard body and a mainboard end part which is connected to the connecting member; the side of the mainboard body away from the mainboard end part is connected to an antenna; and a matching network is arranged between the mainboard body and the mainboard end part and configured to control the distribution of the surface current induced by the antenna on the mainboard.

By arranging the matching network between the mainboard body and the mainboard end part of the wireless communication device and changing, through the matching network, the distribution of the surface current induced by the antenna, the wireless communication device of the embodiments of the present invention can simultaneously guarantee the SAR performance and the wireless performance of the wireless communication terminal and improve the user experience.

BRIEF DESCRIPTION OF THE DRAWINGS

To illustrate the technical solutions according to the embodiments of the present invention more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DETAILED DESCRIPTION

In order to make the objectives, technical solutions, and advantages of the present invention clearer, the following clearly describes the technical solutions according to the embodiments of the present invention with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

An embodiment of the present invention provides a wireless communication device, and the wireless communication device may specifically include a mainboard and a connecting member; the mainboard may specifically include a mainboard body and a mainboard end part which is connected to the connecting member. The side of the mainboard body away from the mainboard end part is connected to an antenna; and a matching network is arranged between the mainboard body and the mainboard end part and configured to control the distribution of the surface current induced by the antenna on the mainboard. In the embodiment, when the wireless communication device is connected to a computer or other devices through its connecting member, the computer may be equivalent to a grounding terminal, and the grounding path of the mainboard is formed of the antenna, the mainboard body, the matching network, the mainboard end part, the connecting member and the computer; the surface current induced by the antenna reaches the computer grounding terminal from the mainboard body. In the embodiment, by arranging the matching network between the mainboard body and the mainboard end part, the mainboard body is electrically connected to the mainboard end part. Because the matching network in the embodiment is configured to control the distribution of the surface current induced by the antenna, the distribution of the surface current on the mainboard is changed after the matching network is arranged, and the SAR performance and the wireless performance of the wireless communication device are related to the distribution of the surface current on the mainboard, so the SAR performance and the wireless performance of the wireless communication device can be improved by adding the matching network on the mainboard.

An embodiment provides a wireless communication device, which can simultaneously guarantee the SAR performance and the wireless performance of a wireless communication terminal and improve the user experience by arranging a matching network between a mainboard body and the mainboard end part of the wireless communication device and changing, through the matching network, the distribution of the surface current induced by the antenna.

Figure 1:
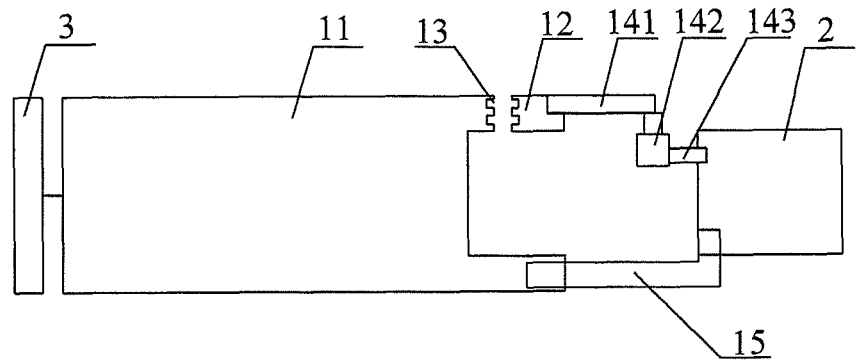
FIG. 1 is a schematic structural diagram a wireless communication device according to Embodiment 1 of the present invention.

FIG. 1 is a schematic structural diagram of a wireless communication device according to Embodiment 1 of the present invention. As shown in FIG. 1, the embodiment provides a wireless communication device, and the wireless communication device is specifically a wireless communication device with a rotatable data connector, that is, a connecting member 2 in the wireless communication device is the rotatable data connector; the data connector and a mainboard can rotate relatively through a rotating shaft; the data connector in the embodiment may be specifically a USB plug; the following describes the device by taking the USB plug as an example. The wireless communication device may specifically include the mainboard and the connecting member 2, in which, the mainboard may specifically include a mainboard body 11 and a mainboard end part 12 which is connected to the connecting member 2.

In FIG. 1, the side of the mainboard body 11 away from the mainboard end part 12 is connected to an antenna 3; and a matching network 13 is arranged between the mainboard body 11 and the mainboard end part 12. In the embodiment, the mainboard body 11 and the mainboard end part 12 are connected integrally at one side of the mainboard body 11 and connected through the matching network 13 at the other side of the mainboard body 11, and the mainboard end part 12 is connected to the USE plug through a first metal elastic pin 141, a metal rotating shaft 142, a second metal elastic pin 143 and a connective part 15, in which the connective part 15 may be specifically a flexible printed circuit board FPC or a conducting wire When the wireless communication device is connected to a computer through its USB plug, two grounding paths are also formed on the mainboard in the embodiment. The first grounding path is formed of the mainboard body 11 and the mainboard end part 12 that are integrally connected, the connective part 15, the USB plug and a computer grounding terminal, and the second grounding path is formed of the mainboard body 11, the matching network 13, the mainboard end part 12, the first metal elastic pin 141, the metal rotating shaft 142, the second metal elastic pin 143, the USB connector and the computer grounding terminal. One end of the first metal elastic pin 141 is connected to the USE connector and the other end is connected to the metal rotating shaft 142. One end of the second metal elastic pin 143 is connected to the metal rotating shaft 142 and the other end is connected to the matching network 13. In the embodiment, by arranging the first metal elastic pin, the metal rotating shaft and the second metal elastic pin between the mainboard and the USE connector, the USE connector can rotate with the metal rotating shaft as an axis, for example, rotate by 90 degrees or 180 degrees, in order to meet the requirements of a user in the specific use. FIG. 1 is specifically a schematic structure of the wireless communication device after the USB connector rotates by 180 degrees.

Figure 2:
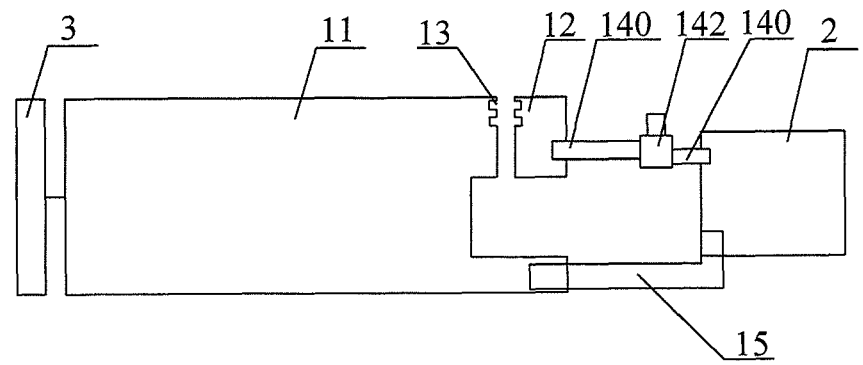
FIG. 2 is a schematic structural diagram of a wireless communication device according to Embodiment 2 of the present invention.

In a wireless communication device provided by an embodiment, as shown in FIG. 2 which is a schematic structural diagram of a wireless communication device according to Embodiment 2 of the present invention, the first metal elastic pin and the second metal elastic pin mentioned above may also be replaced by an integrated metal elastic sheet 140 and the integrated metal elastic sheet 140 is in contact with a metal rotating shaft 142 (the metal elastic sheet 140 can also be not in contact with the metal rotating shaft 142 when the metal rotating shaft 142 is not a metal material). The shape of the metal elastic sheet 140 may be a straight strip as shown in FIG. 2, and may also be other shapes such as a folded line.

Specifically, a matching network in the embodiment may be specifically a low-pass filter circuit that may be formed of an inductor L or a capacitor C, or implemented by a combination of any two or three of a resistor R, a capacitor C and an inductor L. That is, the low-pass filter circuit of the embodiment may be implemented by an inductor, also by a capacitor, further by a combination of a resistor and a capacitor or by a combination of a resistor and an inductor or by a combination of an inductor and a capacitor, and further by a combination of a resistor, a capacitor and an inductor. In the embodiment, a pad may be reserved at a gap between the mainboard body and the mainboard end part, that is, a pad is reserved in the second grounding path to connect a parameter element, thereby forming the matching network. The specific filtering performance of the low-pass filter circuit may be implemented by adjusting a specific parameter of the connected parameter element.

In the embodiment, by adding the matching network which serves as the low-pass filter circuit between the mainboard body and the mainboard end part of the wireless communication device, the embodiment can guarantee that the distribution of the low-band surface current on the mainboard does not change, that is, guarantee that the low-frequency wireless performance of the wireless communication device does not change. The distribution of the high-band surface current on the mainboard is changed, and the high-band surface current cannot reach the USE connector via a path with the matching network, but can reach the USE connector via the other path only, so that the high-band surface current is concentrated on the other path, forming another SAR hotspot in addition to an original hotspot on the mainboard at the USE connector near a connecting device (for example, the computer), so that the USE connector and the connecting device can share more microwave energy, the distribution of the near-field energy on the mainboard becomes more uniform, and the maximum value of the original SAR hotspot on the mainboard is reduced, thereby improving the SAR performance. Because the SAR performance of the wireless communication terminal is directly related to the distribution uniformity of the near-field energy of the wireless terminal device, the maximum value of the SAR hotspot becomes lower when the distribution of the near-field energy is more uniform, that is, the SAR value of the wireless communication terminal is lower.

Therefore, in the embodiment, by adding the low-pass filter circuit between the mainboard body and the mainboard end part of the wireless communication device, the distribution of the high-band surface current induced by the antenna is changed on the mainboard, so that the distribution of the near-field energy of the wireless terminal device is uniform, therefore the high-frequency SAR value of the wireless communication device may be reduced, that is, the high-frequency SAR performance of the wireless communication terminal may be improved. It may therefore be seen that when the rotatable USB connector of the wireless communication device rotates by 90 degrees or 180 degrees, the SAR performance of the wireless communication device can be improved significantly through the arranged matching network on the premise of guaranteeing a desirable low-frequency wireless performance of the wireless communication device.

Further, referring to FIG. 1, the matching network arranged between the mainboard body and the mainboard end part in the embodiment may further be specifically a high-pass low-cut filter circuit, and the high-pass low-cut filter circuit is configured to keep the distribution of the low-band surface current induced by the antenna on the mainboard unchanged when the USB connector rotates. In the embodiment, the matching network which serves as the high-pass low-cut filter is arranged between the mainboard body and the mainboard end part and plays a role in choking the low-frequency current that is resulted from the induction of the antenna and on the mainboard, so that the embodiment ensures, through the arrangement of the network, that the distribution of the low-band surface current do not change with the changes of application conditions. Because a rotation scenario of the USB connector of the wireless communication device changes, for example, the USB connector rotates from 90 degrees to 180 degrees, the change of the rotation scenario leads to a change of the structure of the grounding circuit, so that the distribution of the surface current changes, thereby affecting the wireless performance in different application scenarios.

In the embodiment, by arranging the matching network which serves as the high-pass low-cut filter, the effects of the grounding terminal of the computer on the current distribution are weakened on the mainboard indifferent rotation scenarios of the USB connector, and then keeps the low-pass wireless performance unchanged on the premise of guaranteeing the desirable high-frequency wireless performance, in order to solve a problem of differences of the wireless performance in various rotation scenarios caused by the wireless communication device with the rotatable USB connector during the rotation of the USB connector.

In the embodiment, the high-pass low-cut filter circuit may be formed of an inductor L or a capacitor C, or implemented by the combination of any two or three of a resistor R, a capacitor C and an inductor L. That is, the low-pass filter circuit of the embodiment may be implemented by an inductor, and also by the capacitor, and further by a combination of a resistor and a capacitor, or by a combination of a resistor and an inductor, or by a combination of an inductor and a capacitor, and further by a combination of a resistor, a capacitor and an inductor. In the embodiment, a pad may be reserved at a gap between the mainboard body and the mainboard end part, that is, a pad is reserved in the second grounding path to connect a parameter element, thereby forming the high-pass low-cut filter circuit. The specific filtering performance of the high-pass low-cut filter circuit may be implemented by adjusting a specific parameter of the connected parameter element.

Figure 3:
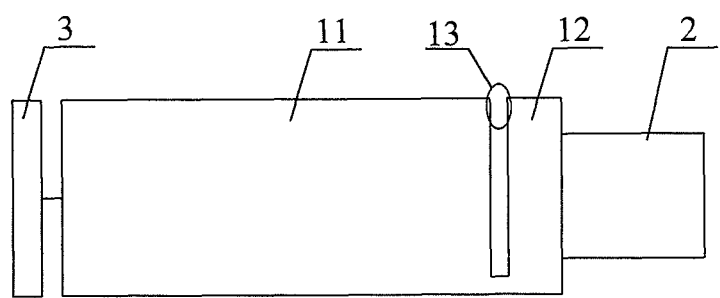
FIG. 3 is a schematic structural diagram of a wireless communication device according to Embodiment 3 of the present invention.

FIG. 3 is a schematic structural diagram of a wireless communication device according to Embodiment 3 of the present invention. As shown in FIG. 3, the embodiment provides a wireless communication device and the wireless communication device is a wireless communication device with a straight-plug data connector, that is, a connecting member 2 in the wireless communication device is the straight-plug data connector, in which the data connector may slide relative to a mainboard, for example, may slide in a direction of the long side of the mainboard or in a direction at an angle of 90 degrees with that direction. The data connector in the embodiment may be specifically a USB connector, and the following describes the device by taking the USB connector as an example. The wireless communication device may specifically include the mainboard and a connecting member 2, in which, the mainboard may specifically include a mainboard body 11 and a mainboard end part 12 which is connected to the connecting member 2. The side of the mainboard body 11 away from the mainboard end part 12 is connected to an antenna 3; a matching network 13 is arranged between the mainboard body 11 and the mainboard end part 12. The mainboard body 11 and the mainboard end part 12 are connected integrally at one side of the mainboard body 11 and connected through the matching network 13 at the other side of the mainboard body 11. That is, two connecting paths are provided between the mainboard body 11 and the mainboard end part 12. At the upper part of the mainboard body 11 in FIG. 3, the mainboard body 11 and the mainboard end part 12 are connected through the matching network 13, and at the lower part of the mainboard body 11 in FIG. 3, the mainboard body 11 and the mainboard end part 12 are an integrally connected structure.

Specifically, referring to FIG. 2, by arranging a gap in the mainboard, the mainboard is divided into the mainboard body 11 and the mainboard end part 12 in the embodiment; the gap does not pass through the mainboard, and the mainboard body 11 and the mainboard end part 12 are still connected integrally at the lower part of the mainboard; the matching network 13 is arranged at the gap provided on the upper part of the mainboard, and the mainboard body 11 and the mainboard end part 12 are electrically connected through the matching network 13. When the wireless communication device is connected to a computer or other devices through its USB connector, two grounding paths are formed between the mainboard and the computer. The first grounding path is formed of the mainboard body 11 and mainboard end part 12 that are integrally connected, the connecting member 2 (that is, the USB connector) of the wireless communication device and a computer grounding terminal, and the second grounding path is formed of the mainboard body 11, the matching network 13, the mainboard end part 12, the connecting member 2 of the wireless communication device and the computer grounding terminal.

In the embodiment, the matching network may be specifically a low-pass filter circuit, which can be formed of an inductor L or a capacitor C, or implemented by a combination of any two or three of a resistor R, a capacitor C and an inductor L. That is, the low-pass filter circuit of the embodiment can be implemented by an inductor, and also by a capacitor, and further by a combination of a resistor and a capacitor, or by a combination of a resistor and an inductor, or by a combination of an inductor and a capacitor, and further by a combination of a resistor, a capacitor and an inductor. In the embodiment, a pad may be reserved at a gap between the mainboard body and the mainboard end part, that is, a pad is reserved in the second grounding path to connect a parameter element, thereby forming the matching network. The specific filtering performance of the low-pass filter circuit may be implemented by adjusting a specific parameter of the connected parameter element.

In the embodiment, by adding the matching network which serves as the low-pass filter circuit between the mainboard body and the mainboard end part of the wireless communication device, the embodiment may guarantee that the distribution of the low-band surface current on the mainboard does not change after the surface current induced by the antenna passes through the matching network, that is, can guarantee that the low-frequency wireless performance of the wireless communication device does not change. The distribution of the high-band surface current on the mainboard changes, and the high-band surface current cannot reach the USB connector from a path with the matching network, but can reach the USB connector from the other path only, so that the high-band surface current is concentrated on the other path, forming another SAR hotspot in addition to an original SAR hotspot on the mainboard near the USB connector, so that the portion of the USB connector near the connecting device may share more microwave energy, the distribution of the near-filed energy on the mainboard is then more uniform, and the maximum value of the original SAR hotspot on the mainboard is reduced, thereby improving the SAR performance. Because the SAR performance of the wireless communication terminal is directly related to the distribution uniformity of the near-field energy of the wireless terminal device, the maximum value of the SAR hotspot becomes lower when the distribution of the near-field energy, is more uniform, that is, the SAR value of the wireless communication terminal is lower.

Therefore, in the embodiment, by adding the low-pass filter circuit between the mainboard body and the mainboard end part of the wireless communication device, the distribution of the high-band surface current induced by the antenna is changed on the mainboard, so that the distribution of the near-field energy of the wireless terminal device is uniform, therefore the high-frequency SAR value of the wireless communication device may be reduced, that is, the high-frequency SAR performance of the wireless communication terminal may be improved. The low-frequency SAR value of the current wireless communication device may usually satisfy the corresponding SAR index, it may therefore be seen that the embodiment may significantly improve the high-frequency SAR performance, that is, significantly improve the SAR performance of the wireless communication device on the premise of guaranteeing the desirable low-frequency wireless performance of the wireless communication device.

Certainly, the matching network may also be a high-pass low-cut filter circuit.

Furthermore, it should be noted that, the connecting member in the embodiments may further be a second circuit board, which may be a circuit board capable of rotating or sliding relative to the mainboard, for example, the upper circuit board of a flip phone or a slide phone. The data connector in the embodiments may be a USE connector, a serial port connector, an IEEE 1394 connector, a high definition multimedia interface (High Definition Multimedia Interface, hereinafter referred to as HDMI) connector, and so on. The wireless communication device may be a device, such as a data card and a mobile phone.

Finally, it should be noted that the foregoing embodiments are merely provided for describing the technical solutions of the present invention, but not intended to limit the present invention. It should be understood by persons skilled in the art that although the present invention is described in detail with reference to the embodiments, modifications may be made to the technical solutions described in the embodiments, or equivalent replacements may be made to some technical features in the technical solutions, as long as such modifications or replacements do not cause the essence of corresponding technical solutions to depart from the spirit and scope of the technical solutions in the embodiments of the present invention.

What is claimed is:

1. A wireless communication device, comprising a mainboard and a connecting member, wherein:
   the mainboard comprises a mainboard body and a mainboard end part which is connected to the connecting member;
   a side of the mainboard body away from the mainboard end part is connected to an antenna;
   a matching network is arranged between the mainboard body and the mainboard end part and configured to control distribution of a surface current induced by the antenna on the mainboard;
   the mainboard body and the mainboard end part are connected integrally at one side of the mainboard body and connected through the matching network at the other side of the mainboard body so that:
      when the wireless communication device is connected to a host device through the connecting member, a first grounding path is formed of the mainboard body and the mainboard end part that are integrally connected, the connecting member and a grounding terminal of the host device, and a second grounding path is formed of the mainboard body, the matching network, the mainboard end part, the connecting member and the grounding terminal of the host device;
   wherein in the first and second grounding paths, only the second grounding path is disposed with a matching network.

2. The device according to claim 1, wherein the connecting member and the mainboard are rotatable relatively through a rotating shaft; the mainboard end part is connected to the connecting member through a metal elastic pin and a connective part; and the metal elastic pin and the connective part further forms a part of the second grounding path.

3. The device according to claim 1, wherein the connecting member and the mainboard are rotatable relatively through a metal rotating shaft; the mainboard body and the mainboard end part are connected integrally at one side of the mainboard body and connected through the matching network at the other side of the mainboard body; the mainboard end part is connected to the connecting member through a first metal elastic pin, the metal rotating shaft, a second metal elastic pin and a connective part; one end of the first metal elastic pin is connected to the connecting member, and the other end is connected to the metal rotating shaft; and one end of the second metal elastic pin is connected to the metal rotating shaft, and the other end is connected to the matching network.

4. The device according to claim 1, wherein the connecting member is a straight-plug data connector; the mainboard body and the mainboard end part are connected integrally at one side of the mainboard body and connected through the matching network at the other side of the mainboard body.

5. The device according to claim 2, wherein the connecting member is a second circuit board.

6. The device according to claim 3, wherein the connecting member is a second circuit board.

7. The device according to claim 1, wherein the connecting member is a second circuit board which is capable of sliding relative to the mainboard; the mainboard body and the mainboard end part are connected integrally at one side of the mainboard body and connected through the matching network at the other side of the mainboard body.

8. The device according to claim 1, wherein the matching network is a low-pass filter circuit which is configured to change distribution of a high-band surface current induced by the antenna on the mainboard.

9. The device according to claim 1, wherein the matching network is a high-pass low-cut filter circuit which is configured to keep distribution of a low-band surface current induced by the antenna on the mainboard unchanged.

10. The device according to claim 8, wherein the low-pass filter circuit is formed of an inductor, a capacitor or a combination of any two or three of the inductor, the capacitor and a resistor.

11. The device according to claim 9, wherein the high-pass low-cut filter circuit is formed of an inductor, a capacitor or a combination of any two or three of the inductor, the capacitor and a resistor.

12. The device according to claim 2, wherein the connective part is a flexible printed circuit board FPC or a conducting wire.

13. The device according to claim 3, wherein the connective part is a flexible printed circuit board FPC or a conducting wire.

14. The device according to claim 5, wherein the connective part is a flexible printed circuit board FPC or a conducting wire.

15. The device according to claim 6, wherein the connective part is a flexible printed circuit board FPC or a conducting wire.

16. The device according to claim 2, wherein the matching network is a low-pass filter circuit which is configured to change distribution of a high-band surface current induced by the antenna on the mainboard.

17. The device according to claim 3, wherein the matching network is a low-pass filter circuit which is configured to change distribution of a high-band surface current induced by the antenna on the mainboard.

18. The device according to claim 2, wherein the matching network is a high-pass low-cut filter circuit which is configured to keep distribution of a low-band surface current induced by the antenna on the mainboard unchanged.

19. The device according to claim 3, wherein the matching network is a high-pass low-cut filter circuit which is configured to keep distribution of a low-band surface current induced by the antenna on the mainboard unchanged.

20. The device according to claim 7, wherein the matching network is a high-pass low-cut filter circuit which is configured to keep distribution of a low-band surface current induced by the antenna on the mainboard unchanged.

* * * * *